United States Patent [19]

Forsten et al.

[11] Patent Number: 5,578,368
[45] Date of Patent: Nov. 26, 1996

[54] FIRE-RESISTANT MATERIAL COMPRISING A FIBERFILL BATT AND AT LEAST ONE FIRE-RESISTANT LAYER OF ARAMID FIBERS

[75] Inventors: Herman H. Forsten; Michael S. Frankosky; Wo K. Kwok, all of Hockessin, Del.

[73] Assignee: E. I. Du Pont de Nemours and Company, Wilmington, Del.

[21] Appl. No.: 283,088

[22] Filed: Jul. 29, 1994

Related U.S. Application Data

[63] Continuation of Ser. No. 927,453, Aug. 17, 1992, abandoned.

[51] Int. Cl.$^6$ .............................. D03D 3/00; B32B 5/02; B32B 5/06
[52] U.S. Cl. ..................... 428/229; 428/233; 428/234; 428/236; 428/287; 428/299; 428/302; 428/902; 428/920
[58] Field of Search ..................... 428/234, 236, 428/246, 252, 300, 287, 902, 920, 921, 229, 233, 299, 302; 156/176, 93, 436, 148

[56] References Cited

U.S. PATENT DOCUMENTS

| | | | |
|---|---|---|---|
| 4,100,323 | 7/1978 | Forsten | 428/280 |
| 4,117,578 | 10/1978 | Forsten | 28/112 |
| 4,199,642 | 4/1980 | Cooper et al. | 428/288 |
| 4,255,817 | 3/1981 | Heim | 2/2 |
| 4,463,465 | 8/1984 | Parker et al. | 5/459 |
| 4,505,687 | 3/1985 | Munro | 446/368 |
| 4,536,439 | 8/1985 | Forsten | 428/280 |
| 4,547,904 | 10/1985 | Long et al. | 2/2.1 R |
| 4,569,088 | 2/1986 | Frankenburg et al. | 2/81 |
| 4,623,571 | 11/1986 | Yamamoto et al. | 428/68 |
| 4,630,864 | 12/1986 | Toll | 297/232 |
| 4,690,851 | 9/1987 | Auduc et al. | 428/116 |

(List continued on next page.)

FOREIGN PATENT DOCUMENTS

| | | |
|---|---|---|
| 0128712 | 11/1986 | European Pat. Off. . |
| 0307290 | 9/1988 | European Pat. Off. . |
| 2592334 | 7/1987 | France . |
| 2620080 | 3/1989 | France . |
| 2-26975 | 1/1990 | Japan . |
| 2179067 | 2/1987 | United Kingdom . |

OTHER PUBLICATIONS

State of Calif., Dept. of Consumer Affairs, Bureau of Home Furnishings and Thermal Insultaion, Technical Bulletin 133, Jun. 1990.
British Standards Institution: Fire Tests for Furniture, Part 2: Methods of test for the ignitability of upholstered composites for seating by flaming sources, BS5852, 1982.
ASTM Designation D4108–87: Standard Test Method for Thermal Protective Performance of Materials for Clothing by Open–Flame Method, pp. 303–309.
1986 Edition of the National Fire Protection Assoc., 1971 Protective Clothing/Fire Fighting Standards and Procedures, pp. 1971-1–1971-15.
Boston Fire Department Chair Test, Draft, pp. 1–5, 1986.
E. I. Du Pont de Nemours and Co., "NOMEX III".
Lenzing AG, "Lenzing P84".
Phillips Fibers Corp., "Ryton Sulfar Fiber", Apr., 1991.

*Primary Examiner*—James D. Withers

[57] ABSTRACT

A fire-resistant material used in items such as sleeping bags, comforters, wearing apparel, upholstered furniture and mattress tops comprises a fiberfill batt and a layer of a fire-resistant aramid fiber contacting at least one side of the aramid fiber layer. The fiberfill batt may comprise synthetic fiber, which may be either polyester fiber or polyolefin fiber. Alternatively, the fiberfill batt may comprise natural fiber. The aramid fiber layer may comprise poly(m-phenylene isophthalamide) fiber, poly(p-phenylene terephthalamide) fiber or a blend of poly(m-phenylene isophthalamide) and poly(p-phenylene terephthalamide) fiber. The aramid fiber layer may be needle-punched, hydroentangled, or laminated to the fiberfill batt.

15 Claims, 1 Drawing Sheet

U.S. PATENT DOCUMENTS

| | | | |
|---|---|---|---|
| 4,726,987 | 2/1988 | Trask et al. | 428/282 |
| 4,743,495 | 5/1988 | Lilani et al. | 428/234 |
| 4,748,065 | 5/1988 | Tanikella | 428/152 |
| 4,750,443 | 6/1988 | Blaustein et al. | 112/420 |
| 4,780,359 | 10/1988 | Trask et al. | 428/234 |
| 4,806,185 | 2/1989 | Porter et al. | 428/921 |
| 4,835,046 | 5/1989 | Auduc et al. | 428/288 |
| 4,865,906 | 12/1989 | Smith, Jr. | 428/224 |
| 4,879,168 | 11/1989 | McCullough, Jr. et al. | 428/224 |
| 4,888,091 | 12/1989 | Nollen et al. | 162/109 |
| 4,923,729 | 5/1990 | Porter et al. | 428/71 |
| 4,937,136 | 6/1990 | Coombs | 428/921 |
| 4,950,540 | 8/1990 | McCullough, Jr. et al. | 428/369 |
| 4,980,228 | 12/1990 | LaMarca, II et al. | 428/251 |
| 4,994,317 | 2/1991 | Dugan et al. | 428/246 |
| 5,146,625 | 9/1992 | Steele et al. | 2/102 |
| 5,171,339 | 12/1992 | Forsten | 55/379 |
| 5,226,384 | 7/1993 | Jordan | 119/28.5 |

FIRE-RESISTANT MATERIAL COMPRISING A FIBERFILL BATT AND AT LEAST ONE FIRE-RESISTANT LAYER OF ARAMID FIBERS

This is a continuation of application Ser. No. 07/927,453 filed Aug. 17, 1992, now abandoned.

FIELD OF THE INVENTION

The present invention relates to a fire-resistant material which may be used in items such as sleeping bags, comforters, wearing apparel, upholstered furniture or mattress tops. In particular, the present invention relates to a fire-resistant material comprising a fiberfill batt and an aramid fiber layer contacting the fiberfill batt.

DESCRIPTION OF THE RELATED ART

Fabrics made from poly(p-phenylene terephthalamide) (PPD-T) or poly(m-phenylene isophthalamide) (MPD-I) are known for their fire-blocking qualities, as disclosed in U.S. Pat. No. 4,994,317 to Dugan et al. However, these fabrics have very little insulation value. Fiberfill batts are often used as insulation in items such as wearing apparel, comforters and sleeping bags and as cushioning in upholstered furniture and mattress tops. These fiberfill batts usually have very little fire resistance. Moreover, it is often desirable to add a slickener, such as silicone, to a fiberfill batt to provide softness and resiliency to the batt, or a resin binder to stabilize the batt and make it more durable when washed. However, the addition of a slickener or a resin binder increases the flammability of the batt.

One method for increasing the fire-resistance of polyester fiberfill is to blend fire-resistant fiber into the fiberfill batt. For example, U.S. Pat. No. 4,199,642 to Cooper et al. discloses that the addition of 2–20% by weight of aramid filamentary material to polyester fiberfill reduces the burning rate of the fiberfill. However, Cooper et al. does not impart a fire-blocking capability to the polyester fiberfill. Consequently, the polyester fiberfill of the Cooper et al. patent is allowed to burn, albeit at a reduced rate. In uses where the fiberfill is near the skin, such as wearing apparel, comforters and sleeping bags, this flame-retarding capability may not be adequate.

SUMMARY OF THE INVENTION

Accordingly, it is an object of the present invention to impart fire-blocking capability to a fiberfill batt.

Additional objects and advantages of the invention will be set forth in the description which follows and, in part, will be obvious from the description or may be learned by practice of the invention. The objects and advantages of the invention may be realized and obtained by means of the instrumentalities and combinations particularly pointed out in the appended claims.

To achieve the foregoing objects, and in accordance with the purposes of the inventions as embodied and broadly described herein, there is provided a fire-resistant material. The fire-resistant material comprises a fiberfill batt and an aramid layer contacting the fiberfill batt. The fiberfill batt may comprise synthetic fiber, such as polyester fiberfill or polyolefin fiber, or natural fiber. The aramid layer may comprise poly(p-phenylene terephthalamide), poly(m-phenylene isophthalamide) or a blend of the two.

DETAILED DESCRIPTION OF THE PREFERRED EMBODIMENTS

Reference will now be made in detail to the preferred embodiments of the invention as presented in the following text.

In accordance with the present invention, there is provided a fire-resistant material. The fire-resistant material is shown generally at 10 in FIG. 1. The fire-resistant material of the present invention comprises a fiberfill batt shown at 12 in FIG. 1.

The fiberfill batt may comprise synthetic fiber. In particular, the synthetic fiber may comprise polyester fiberfill. An example of polyester fiberfill suitable for use with the present invention is polyethylene terephthalate, marketed under the trademark "HOLLOFIL" (otherwise referred to as Hollofil®) by E. I. du Pont de Nemours and Company of Wilmington, Del. Further examples of polyester fiberfill suitable for use with the present invention include Thermolite$^{CM}$, Thermoloft$^{CM}$ and Quallofil$^{CM}$, also marketed by E. I. du Pont de Nemours and Company of Wilmington, Del. In an alternative embodiment of the present invention, the synthetic fiber may comprise polyolefin fiber. A polyolefin fiber suitable for use with the present invention is marketed as "THINSULATE" (hereinafter referred to as Thinsulate®) and is commercially available from Minnesota, Mining and Manufacturing Co. of St. Paul, Minn. In alternative embodiments of the present invention, synthetic fiber may include rayon or nylon. In yet another embodiment of the present invention, the fiberfill batt may comprise natural fiber. Natural fiber may include naturally occurring (not manmade) fibers such as wool, cotton, straw, etc. In all of the embodiments of the present invention, the fiberfill batt may be slickened with a slickening agent, such as silicone. The slickening agent is added to impart softness and resiliency to the fiberfill batt.

Figure 1:
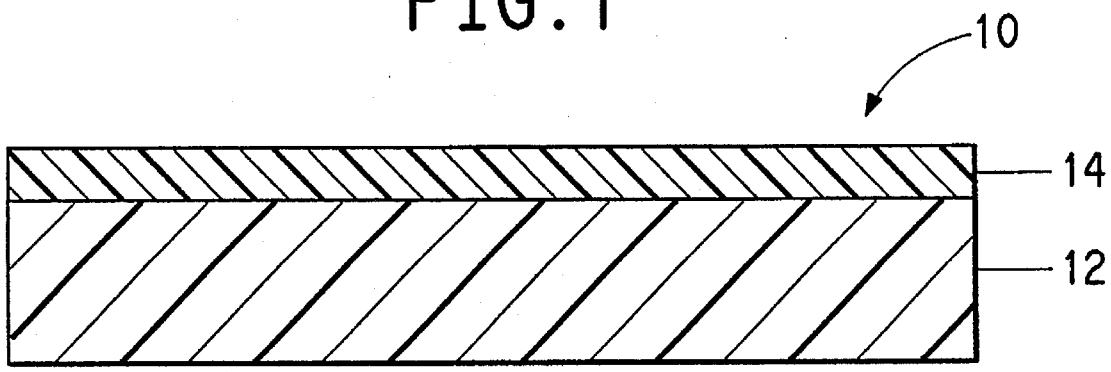
FIG. 1 is a cross-sectional view showing one embodiment of the fire-resistant material of the present invention.

In accordance with the present invention there is provided a layer 14 as shown in FIG. 1 of a fire-resistant aramid fiber contacting the fiberfill batt. In the embodiment shown in FIG. 1, the aramid fiber layer contacts only one side of the fiberfill batt. The aramid fiber layer may comprise poly(p-phenylene terephthalamide)(PPD-T), which is marketed as "KEVLAR" (hereinafter referred to as Kevlar®) by E. I. du Pont de Nemours and Company of Wilmington, Del. In another embodiment, the aramid fiber layer may comprise poly(m-phenylene isophthalamide)(MPD-I), which is marketed as "NOMEX" (hereinafter referred to as Nomex®) by E. I. du Pont de Nemours and Company of Wilmington, Del. In yet another embodiment, the aramid fiber layer may comprise a blend of PPD-T and MPD-I fibers. In this blend embodiment, the aramid fiber layer may be present in, but not limited to, the following proportions: 50% PPD-T/50% MPD-I or 80% PPD-T/20% MPD-I.

The aramid fiber layer may comprise a woven or a non-woven fabric. The non-woven fabric may comprise a needle-punched fabric when the aramid fiber layer comprises Kevlar®, Nomex® or a blend of Kevlar® and Nomex®. Alternatively, the non-woven fabric may comprise a hydroentangled fabric when the aramid fiber layer comprises either Kevlar® or a blend of the Kevlar® and Nomex®. The aramid fiber layer may be needle-punched or hydroentangled to the fiberfill batt when the aramid fiber layer comprises either Kevlar® or a blend of Kevlar® and Nomex®. In an alternative embodiment, when the aramid fiber layer comprises either Kevlar®, Nomex® or a blend of the two, the aramid fiber layer may be laminated to the fiberfill batt.

It is desirable that the aramid fiber layer of the present invention not have holes that expose the fiberfill batt to open flame and allow it to catch fire. Therefore, the air permeability of the aramid fiber layer must not be too high. An example of air permeability suitable for the present invention of a 2 oz./sq. yd. (67 g./sq.m.) aramid fiber layer made of 100% Kevlar® fiber is 131 cu. ft./min./sq. ft. (39.5 cu.m./min./sq.m.) unwashed; 198 cu. ft./min./sq. ft. (59.7 cu.m./min./sq.m.) after one wash; and 223 cu. ft./min./sq. ft. (67.2 cu.m./min./sq.m.) after three washes. It should be understood that these values are exemplary only, and that the air permeability varies with, among other factors, the basis weight of the sample of the aramid fiber layer, the number of times it is washed and the method of preparation of the sample (e.g., needle-punching or hydroentangling).

Figure 2:
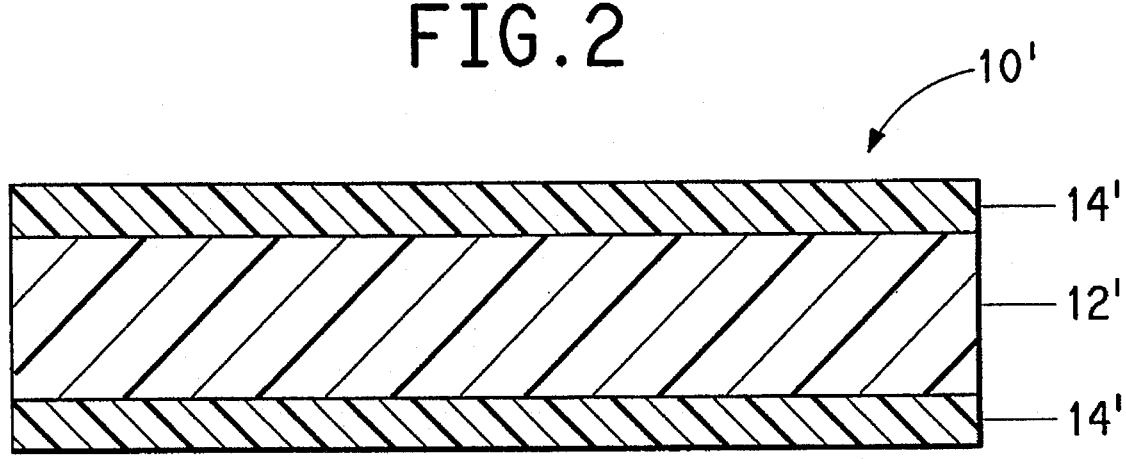
FIG. 2 is a cross-sectional view showing a second embodiment of the fire-resistant material of the present invention.

A fire-resistant material according to another embodiment of the present invention is shown generally at 10' in FIG. 2. Fire-resistant material 10' comprises a fiberfill batt 12' which is in all respects like the fiberfill batt of the embodiment of FIG. 1. Fire-resistant material 10' also comprises an aramid fiber layer 14' contacting the fiberfill batt. Aramid fiber layer 14' is in all respects like the aramid fiber layer in the embodiment of FIG. 1, except that it contacts both sides of the fiberfill batt instead of just one as in the embodiment of FIG. 1.

The purpose of the present invention is to impart fire-resistance to a normally flammable fiberfill batt by providing a layer of a fire-resistant aramid fiber on at least one side of the fiberfill batt. The configuration of embodiment of FIG. 2, where the layer of the fire-resistant aramid fiber is provided on both sides of the batt, imparts an additional advantage to the present invention. The fire-resistant material of the embodiment of FIG. 2 is particularly useful for items such as wearing apparel, sleeping bags and comforters. In such uses, the aramid fiber layer contacting one side of the fiberfill batt acts as a fire-blocking mechanism. In addition, the aramid fiber layer contacting the other side of the batt prevents any melted fiberfill from contacting the skin.

It is noted that in the fire-resistant material of the embodiment of either FIGS. 1 or 2, the aramid fiber layer does not contact the lateral edges of the batt. These lateral edges are very small in area relative to the sides. Protection of these edges from fire could be achieved by having the aramid fiber layers extend beyond the extremes of the sides, and fastening the layers together, such as by stitching or stapling, so as to enclose the batt. In practice, this is what is done when the material of the present invention is made into wearing apparel, sleeping bags, comforters, upholstered furniture and mattress tops.

In accordance with the present invention, there is provided a process for making a fire-resistant material. The process of the present invention comprises the step of contacting at least one side of the fiberfill batt with a layer of an aramid fiber. In some applications of the process of the present invention, such as making upholstered furniture, it is possible that the fire-resistant aramid fiber layer is simply placed in physical contact with the fiberfill batt without any physical attachment thereto. Thus, the contacting step may comprise placing the aramid fiber layer on the fiberfill batt. In another embodiment, the contacting step may comprise needle-punching the aramid fiber layer to the fiberfill batt. In yet another embodiment, the contacting step may comprise hydroentangling the aramid fiber layer to the fiberfill batt. In a further embodiment, the contacting step may comprise laminating the aramid fiber layer to the fiberfill batt. In this embodiment, acrylic adhesives may be used to laminate the aramid fiber layer to the fiberfill batt. Alternatively, heat generated by any means may be used to laminate the aramid fiber layer to the batt. The contacting step may comprise contacting one or both sides of the fiberfill batt with the aramid fiber layer.

It will be apparent to those skilled in the art that various modifications and variations can be made in the present invention without departing from the scope and spirit of the invention. For instance, the choice of materials for the fiberfill batt and the aramid fiber layer discussed above may be extended to other fiberfill fibers and aramid fibers. In addition, the above-mentioned steps of contacting the aramid fiber layer to the fiberfill batt are not exhaustive, but rather are given to illustrate how presently preferred embodiments of the present invention may be carried out.

The invention will be clarified by the following examples, which are intended to be purely exemplary of the invention. The fire-resistant material as described in the following examples has met the fire resistance standards as described in British Standard Institutions BS 5852; Part 2; 1982. The fire-resistant material has also passed the burn test as described in California Technical Bulletin 133; June 1990.

TEST METHODS

The fire resistance of the material of the examples give below was tested using the Thermal Protective Performance (TPP) test as described in ASTM D4108-87 and as modified by the 1986 Edition of National Fire Protection Association Standard 1971, Chapter 5. TPP is the exposure energy required to cause the accumulated heat received by the sensor to equal the heat that will cause a second-degree burn. The time (in seconds) to cause a second degree burn was derived from the TPP ratings and is also presented in the Tables below.

EXAMPLE 1

Control samples of polyester fiberfill were prepared for TPP testing. Control sample A was prepared from a 100 lb. blend of polyester staple containing 37.5% by weight of silicone-slickened fiber of 1.65 denier per filament (dpf), 2 in. (51 mm.) cut lengths; 37.5% by weight of dry fiber (no slickener), with same dpf and cut length; and 25% of "Melty" 4080 binder fiber 4 dpf, 2 in. (51 mm.) cut length, 50/50 sheath/core The "Melty" 4080 binder is commercially available from Unitika, Ltd. of Osaka, Japan. These fibers were blended together, and the resultant blend was needle-punched to form a batt with a basis weight of 3 oz./yd.$^2$ (100 g./m.$^2$).

Another Control Sample Z was formed by the same process as used to form Control Sample A, except the polyester staple fiber contained 78% by weight of 4.5 dpf, solid, round cross section and a 2 in. (51 mm.) cut length polyethylene oxide slickener; 22% by weight "Melty" 4080 with 4 dpf, 2 in. (51 mm.) cut length to form a batt with a basis weight of 3 oz./yd.$^2$.

EXAMPLE 2

An aramid fiber layer was made by hydroentangling 1.5 dpf, 0.85 in. (22 mm.) cut length Kevlar® fiber to form Thermablock$^{CM}$ Z-11 fabric having a basis weight of 1 oz./yd.$^2$ (34 g./m.$^2$). The Thermablock$^{CM}$ Z-11 fabric was needle-punched to one side of a polyester batt (formed the same as Sample A in Example 1 and in this and following examples unless noted otherwise). This resulting sample material was designated as Sample B.

In an identical operation, a Sample C was made except the Thermablock$^{CM}$ Z-11 fabric had a basis weight of 2 oz./yd.$^2$ (67 g./m.$^2$).

The TPP rating of both Samples B and C are presented in Table 1.

EXAMPLE 3

An aramid fiber layer was made by hydroentangling 1.5 dpf, 0.85 in. (22 mm.) cut length Kevlar® fiber to form a Thermablock$^{CM}$ Z-11 fabric having a basis weight of 1 oz./yd.$^2$ (34 g./m.$^2$). The Thermablock$^{CM}$ Z-11 fabric was needle-punched to both sides (top and bottom) of a polyester fiberfill batt. This resulting material was designated Sample D.

In an identical operation, a Sample E was made except the Thermablock$^{CM}$ Z-11 fabric had a basis weight of 2 oz./yd.$^2$ (67 g./m.$^2$).

The TPP ratings of both Samples D and E are presented in Table 1.

EXAMPLE 4

An aramid fiber layer was made from a layer of Kevlar® fiber to form a Thermablock$^{CM}$ Z-11 fabric having a basis weight with a basis weight of 1 oz./yd.$^2$ (34 g./m.$^2$) was laminated onto one side of a polyester fiberfill batt. An acrylic adhesive was used to laminate the aramid fiber layer to the batt. This resulting material was designated Sample F.

In an identical process, a Sample G was made from a layer of Kevlar® fiber to form a Thermablock$^{CM}$ Z-11 fabric having a basis weight of 2 oz./yd.$^2$ (67 g./m.$^2$) laminated to one side of the polyester fiberfill batt. Similarly, a Sample H was made from a layer of an aramid fiber of Kevlar® fiber to form a Thermablock$^{CM}$ Z-11 fabric having a basis weight of 2 oz./yd.$^2$ (67 g./m.$^2$) laminated to both sides (top and bottom) of the polyester fiberfill batt.

The TPP ratings for those three Samples F, G, H are presented in Table 1.

As can be determined from Table 1, the aramid fiber layer provided increasing fire protection with increased basis weights, as indicated by the high TPP rating and increased time to a second degree burn. Also, when the aramid layer was placed on both sides of the fiberfill batt, greater fire resistance as indicated by the same parameters was achieved than when the aramid layer was placed on just one side.

EXAMPLE 5

In this example a control sample K of fiberfill batt was made from Thinsulate®. Thermablock$^{CM}$ Z-11 was used to make the aramid fiber layer for Samples I and J. The layers were laminated on one side and both sides of the batt, respectively, using an acrylic adhesive. The TPP ratings of these samples are presented in Table 2.

EXAMPLE 6

This example demonstrates using an aramid fiber other than Thermablock$^{CM}$ Z-11 as the aramid fiber layer. An aramid fiber layer of Nomex® having a basis weight of 3 oz./yd.$^2$ (100 g./m.$^2$) was formed by needle-punching 1.5 dpf, 1.5 in. (38 mm.) cut length fibers. A layer of Nomex® was then needle-punched to both sides (top and bottom) of a polyester fiberfill batt and designated as Sample L. The TPP results of this sample are presented in table 2.

TABLE 1

| Sample | Method of Attaching Aramid Layer To Polyester Fiberfill Batt | Aramid Layer Basis Wt./No. of Sides | TPP (cal/cm$^2$) | Time To 2nd Degree Burn (sec) | Response To Open Flame Exposure |
|---|---|---|---|---|---|
| A (Control) | — | — | 3.9 | 1.95 | Break Open and Ignition |
| Z (Control) | — | — | 2.7 | 1.35 | " |
| B | N | 1 oz/yd$^2$/1 side | 9.1 | 4.55 | Charring, melting |
| C | N | 2 oz/yd$^2$/1 side | 15.8 | 7.90 | " |
| D | N | 1 oz/yd$^2$/2 sides | 18.0 | 9.00 | Charring |
| E | N | 2 oz/yd$^2$/2 sides | 24.7 | 12.35 | " |
| F | L | 1 oz/yd$^2$/1 side | 15.9 | 7.95 | Charring, melting |
| G | L | 2 oz/yd$^2$/1 side | 18.5 | 9.25 | " |
| H | L | 2 oz/yd$^2$/2 sides | 25.6 | 12.80 | Charring |

N = Needle-punched
L = Laminated

TABLE 2

| Sample | Aramid Layer/Fiberfill Batt | Aramid Layer Basis Weight/ No. of Sides | TPP cal/cm² | Time To 2nd Degree Burn (Sec) | Response To Open Flame Exposure |
| --- | --- | --- | --- | --- | --- |
| I | Kevlar ®/Thinsulate ® | 2 oz/yd²/1 side | 14.8 | 7.4 | Charring, Melting |
| J | Kevlar ®/Thinsulate ® | 2 oz/yd²/2 sides | 24.5 | 12.25 | Charring |
| K | Thinsulate ® (Control) | — | 4.0 | 2.0 | Break Open and Ignition |
| L | Nomex ®/Polyester | 3 oz/yd²/2 sides | 36.4 | 18.2 | Charring |

EXAMPLE 7

This example demonstrates the effect of washing the material in above Examples 2 and 3 (Samples B,C, D and E). The effect of washing was determined by subjecting certain of the samples as listed in Table 1 to three wash cycles by the procedure of ASTM D-4770-88. The TPP ratings of these samples before washing (Control) and after one and after three washings are presented in Table 3.

TABLE 3

| Sample | Aramid Layer Basis Weight/ No. of Sides | No. of Washes | TPP (cal/cm²) | Time To 2nd Degree Burn (sec) | Response To Open Flame Exposure |
| --- | --- | --- | --- | --- | --- |
| B | 1 oz/yd²(1 side) | None | 9.1 | 4.55 | Charring, Melting |
| B | 1 oz/yd²(1 side) | 1 | 9.6 | 4.80 | Charring, Melting |
| B | 1 oz/yd²(1 side) | 3 | 9.2 | 4.60 | Charring, Melting |
| C | 2 oz/yd²(1 side) | None | 15.8 | 7.90 | Charring, Melting |
| C | 2 oz/yd²(1 side) | 1 | 17.5 | 8.75 | Charring, Melting |
| C | 2 oz/yd²(1 side) | 3 | 18.5 | 9.25 | Charring, Melting |
| D | 1 oz/yd²(2 sides) | None | 18.0 | 9.0 | Charring |
| D | 1 oz/yd²(2 sides) | 1 | 19.1 | 9.55 | Charring |
| D | 1 oz/yd²(2 sides) | 3 | 17.8 | 8.90 | Charring |
| E | 2 oz/yd²(2 sides) | None | 24.7 | 12.35 | Charring |
| E | 2 oz/yd²(2 sides) | 1 | 26.9 | 13.45 | Charring |
| E | 2 oz/yd²(2 sides) | 3 | 28.9 | 14.45 | Charring |

As shown in Table 3, washing the material did not have any apparent effect on the TPP ratings of any of the samples tested.

Other embodiments of the invention will be apparent to those skilled in the art from consideration of the specification and practice of the invention described herein. It is understood that the specification and examples be considered as exemplary only, with a true scope and spirit of the invention being indicated by the following claims.

What is claimed is:

1. A fire-resistant material, comprising:
    (a) a batt consisting essentially of fiberfill, wherein the fiberfill batt is slickened; and
    (b) a layer consisting essentially of a fire-resistant aramid fiber contracting at least one side of the fiberfill batt.
2. A fire-resistant material, comprising:
    (a) a bart consisting essentially of natural fiberfill; and
    (b) a layer consisting essentially of a fire-resistant aramid fiber contacting at least one side of the fiberfill batt.
3. A fire-resistant material, comprising:
    (a) a batt consisting essentially of polyester fiberfill; and
    (b) a layer consisting essentially of a fire-resistant aramid fiber contacting at least one side of the fiberfill batt.
4. The fire-resistant material as claimed in any of claims 1, 2 or 3, wherein the aramid fiber layer contacts one side of the fiberfill batt.
5. The fire-resistant material as claimed in any of claims 1, 2 or 3, wherein the aramid fiber layer contacts both sides of the fiberfill batt.
6. The fire-resistant material as claimed in any of claims 1, 2 or 3, wherein the aramid fiber layer consists essentially of one of the following: poly(m-phenylene isophthalamide) fiber, poly(p-phenylene terephthalamide) fiber or a blend of poly(p-phenylene terephthalamide) and poly(mphenylene isophthalamide) fiber.
7. The fire-resistant material as claimed in claim 1, wherein the fiberfill batt consists essentially of synthetic fiber.
8. The fire-resistant material as claimed in claim 7, wherein the synthetic fiber comprises one of the following: polyester fiberfill or polyolefin fiber.
9. The fire-resistant material as claimed in claim 6, wherein the aramid fiber layer comprises a woven fabric.
10. The fire-resistant material as claimed in claim 6, wherein the aramid fiber layer comprises a non-woven fabric.
11. The fire-resistant material as claimed in claim 10, wherein the non-woven fabric comprises a needle-punched fabric.
12. The fire-resistant material as claimed in claim 10, wherein the non-woven fabric comprises a hydroentangled fabric.
13. A fire-resistant material, comprising:
    (a) a batt consisting essentially of polyester staple fiber and a binder fiber, wherein the binder fiber is 25%, by weight, of the batt;
    (b) a layer consisting essentially of poly(m-phenylene isophthalamide)(MPD-I) needle-punched to both sides of the batt.
14. A fire-resistant material, comprising:
    (a) a batt consisting essentially of polyester fiberfill and a binder fiber; and
    (b) a layer consisting essentially of a fire-resistant aramid fiber contacting at least one side of the fiberfill batt.
15. The fire-resistant material as claimed in claim 14, wherein the binder fiber is in the range of 22%–25%, by weight, of the batt.

* * * * *